(12) United States Patent
Gashkov et al.

(10) Patent No.: US 7,167,886 B2
(45) Date of Patent: Jan. 23, 2007

(54) METHOD FOR CONSTRUCTING LOGIC CIRCUITS OF SMALL DEPTH AND COMPLEXITY FOR OPERATION OF INVERSION IN FINITE FIELDS OF CHARACTERISTIC 2

(75) Inventors: Sergei B. Gashkov, Moscow (RU); Alexander E. Andreev, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 657 days.

(21) Appl. No.: 10/430,446

(22) Filed: May 6, 2003

(65) Prior Publication Data

US 2004/0225701 A1 Nov. 11, 2004

(51) Int. Cl.
*G06F 7/00* (2006.01)
(52) U.S. Cl. ..................... 708/492
(58) Field of Classification Search ................. 708/492
See application file for complete search history.

(56) References Cited

U.S. PATENT DOCUMENTS

| | | | | | |
|---|---|---|---|---|---|
| 4,989,171 | A | * | 1/1991 | Hollmann | 708/492 |
| 5,227,992 | A | * | 7/1993 | Lee et al. | 708/492 |
| 5,396,502 | A | * | 3/1995 | Owsley et al. | 714/784 |
| 5,467,297 | A | * | 11/1995 | Zook | 708/492 |
| 5,689,452 | A | | 11/1997 | Cameron | 364/746.1 |
| 5,982,895 | A | * | 11/1999 | Dworkin et al. | 380/271 |
| 6,052,704 | A | * | 4/2000 | Wei | 708/492 |
| 6,141,786 | A | | 10/2000 | Cox et al. | 714/763 |
| 6,199,087 | B1 | * | 3/2001 | Blake et al. | 708/492 |
| 6,202,076 | B1 | * | 3/2001 | Aoki et al. | 708/492 |
| 6,266,688 | B1 | | 7/2001 | Aoki et al. | 708/492 |

\* cited by examiner

*Primary Examiner*—Tan V. Mai
(74) *Attorney, Agent, or Firm*—Suiter-Swantz PC LLO (57) ABSTRACT

A method for constructing a logic circuit for inversion in finite field $GF(2^m)$ is described, where $m=nk$, and k, n are coprime numbers, using bases in subfields $GF(2^n)$ and $GF(2^k)$. The method may be applied to error correction codes, including BCH codes, Reed-Solomon codes (which are a subset of BCH codes), turbo codes, and the like.

7 Claims, 2 Drawing Sheets

METHOD FOR CONSTRUCTING LOGIC CIRCUITS OF SMALL DEPTH AND COMPLEXITY FOR OPERATION OF INVERSION IN FINITE FIELDS OF CHARACTERISTIC 2

FIELD OF THE INVENTION

The present invention generally relates to a scheme for arithmetic operations in finite fields, and more particularly, to a computational scheme for arithmetic operations in finite fields of characteristic 2 such as $GF(2^m)$, where m is a composite number, which is to be utilized in realizing error correction coding.

BACKGROUND OF THE INVENTION

An error correction code is an algorithm for expressing a sequence of numbers such that any errors which are introduced may be detected and corrected (within certain limitations) based on the remaining numbers. The study of error correction codes and the associated mathematics is known as coding theory. The commonly used error correction codes in digital communications and data storage may include BCH (Bose-Chaudhuri-Hochquenghem) codes, Reed-Solomon codes (which are a subset of BCH codes), turbo codes, and the like.

Error correction codes are often defined in terms of Galois or finite field arithmetic. A Galois field is commonly identified by the number of elements which the field contains. The elements of a Galois field may be represented as polynomials in a particular primitive field element, with coefficients in the prime subfield. Since the number of elements contained in a Galois field is always equal to a prime number, q, raised to a positive integer power, m, the notation $GF(q^m)$ is commonly used to refer to the finite field containing $q^m$ elements. In such a field all operations between elements comprising the field yield results which are each elements of the field.

Finite fields of characteristic 2 are important because these fields have data structures suitable for computers and may be utilized in error correction coding and cryptography. Conventionally, inverse calculation over a finite field with characteristic 2 may require an enormous amount of calculations compared with multiplication. For example, a well-known method for calculating inverses in a finite field follows directly from the cyclic structure of such a field that the inverse of a field element may be obtained directly from exponentiation. To be more precise:

$$a^{-1} = a^{-2+2^n}$$

A person skilled in the art will recognize that this operation may be accomplished with 2n−3 multiplications. Logic circuits for inverse operation based on such a method may thus have large depth and- complexity. The depth of a logic circuit is the maximal number of logic elements in a path from a circuit input to a circuit output. The depth may determine the delay of the circuit. The complexity of a logic circuit is the number of logic elements in the circuit. The logic elements may have two inputs and one output.

Therefore, it would be desirable to provide a method for constructing logic circuits of small depth and complexity for operation of inversion in finite fields of characteristic 2.

SUMMARY OF THE INVENTION

Accordingly, the present invention is directed to a method for constructing a logic circuit for inversion in finite field $GF(2^m)$, where m=nk, and k, n are coprime numbers, using bases in subfields $GF(2^n)$ and $GF(2^k)$. The present invention may be applied to error correction codes, including BCH codes, Reed-Solomon codes (which are a subset of BCH codes), turbo codes, and the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

One aspect of the present invention is directed to a method for constructing a logic circuit for inversion in finite field $GF(2^m)$, where m=nk, and k, n are coprime numbers, from its subfield $GF(2^n)$. The advantage of this method may lie in the fact that the structure of the subfield may remain accessible to direct manipulation when this type of construction is used. Furthermore, arithmetic operations defined in $GF(2^m)$ may be directly calculated in terms of arithmetic operations, including addition, multiplication, square, inversion, division, and the like, performed in the constituent subfield $GF(2^n)$.

According to one aspect of the present invention, logic circuits of small depth and complexity for operation of inversion in finite fields of characteristic 2 may be constructed. The depth of a logic circuit is the maximal number of logic elements in a path from a circuit input to a circuit output. The logic elements may include an exclusive OR unit (for addition), a multiplication unit (for multiplication), a square unit (for square, an inverse calculation unit (for inversion), and the like. The depth may determine the delay of the circuit. The complexity of a logic circuit is the number of logic elements in the circuit. The logic elements may have two inputs and one output. The logic circuit constructed according to the present invention may have less depth and complexity than the logic circuit constructed according to the conventional methods if the bases of the finite fields have a dimension less than 32.

The present invention may be applied to error correction codes, including BCH codes, Reed-Solomon codes (which are a subset of BCH codes), turbo codes, and the like because all devices for encoding and decoding may contain modules for multiplication and inversion.

The method of the present invention will be described in detail below.

Denote a polynomial basis in the field $GF(2^n)$ $$B^\alpha = \{1, \alpha, \alpha^2, \alpha^3, \ldots, \alpha^{n-1}\},$$

where $$p(\alpha)=0, p(x)=p_{n-1}x^{n-1}+\ldots+p_0, p_i=0,1$$

and p(x) is an irreducible polynomial (minimal polynomial of element $\alpha$-base generator).

Denote a normal basis in the field $GF(2^n)$ $$B_\alpha = \{\alpha, \alpha^2, \alpha^4, \alpha^8, \alpha^{16}, \ldots, \alpha^{2^{n-1}}\}$$

Normal bases may exist only for some irreducible polynomials p(x).

Normal bases may have such an advantage that squaring of these bases is equivalent to a shift operation:

$$(x_0\alpha + x_1\alpha^2 + \ldots x_{n-1}\alpha^{2^n})^2 = x_{n-1}\alpha + x_0\alpha^2 + x_1\alpha^4 + \ldots + x_{n-2}\alpha^{n-1}$$

Let $$\xi = \sum_{i=0}^{n-1} x_i \alpha^{2^i}, \quad ^o\zeta = \sum_{j=0}^{n-1} y_j \alpha^{2^j},$$

be any elements of the field $GF(2^n)$, then their product (multiplication) may be represented by the equality:

$$\pi = \sum_{m=0}^{n-1} p_m \alpha^{2^m},$$

where $$p_m = \sum_{i,j=0}^{n-1} t_{i-j,m-j} x_i y_j,$$

$$\alpha \alpha^{2^i} = \sum_{j=0}^{n-1} t_{i,j} \alpha^{2^j},$$

and $t_{i,j}$ is a multiplication table of the given basis.

If one defines a matrix A as $a_{i,j} = t_{i-j,-j}$, where i−j and −j are a subtraction modulo n, then the foregoing formulas may be represented as $$p_m = \sum_{i,j=0}^{n-1} a_{i,j} S^m(x_i) S^m(y_j),$$

where $S^m$ is a shift of the vector on m component, and $$A(x, y) = \sum_{i,j=0}^{n-1} a_{i,j} x_i y_j$$

is a bilinear form associated with the matrix A.

Let m=nk, where k, n are coprime numbers. One may choose in fields $GF(2^n)$, $GF(2^k)$ any normal bases $$B_\alpha = \{\alpha, \alpha^2, \alpha^4, \alpha^8, \alpha^{16}, \ldots, \alpha^{2^{k-1}}\},$$

$$B_\beta = \{\beta, \beta^2, \beta^4, \beta^8, \beta^{16}, \ldots, \beta^{2^{n-1}}\}.$$

Then the product of these bases $$B_{\alpha\beta} = \{\alpha\beta, \alpha\beta^2, \ldots, \alpha\beta^{2^{n-1}}, \ldots, \alpha^{2^{k-1}}\beta, \ldots, \alpha^{2^{k-1}}\beta^{2^{n-1}}\}$$

is some permutation of some normal bases in the field $GF(2^m)$.

Using Quadratic Extension

Let k=2 and n does not divide by 2. One may use in the field $GF(2^{2n})$ a basis $$B_{\alpha\beta} = \{\alpha\beta, \alpha\beta^2, \ldots, \alpha\beta^{2^{n-1}}, \alpha^2\beta, \ldots, \alpha^2\beta^{2^{n-1}}\},$$

which is a product of the optimal normal base of order 2

$$B_\alpha = \{\alpha, \alpha^2,\}, \alpha + \alpha^2 = 1,$$

and any normal (or standard polynomial) basis $B_\beta$.

In field $GF(2^m)$ the norm N of any element $$x_0\alpha + x_1\alpha^2 \in GF(2^m)$$

is equal to $$N = (x_0\alpha + x_1\alpha^2)(x_0\alpha^2 + x_1\alpha)$$

$$= x_0 x_1(\alpha^2 + \alpha^4) + (x_0^2 + x_1^2)\alpha^3$$

$$= (x_0^2 + x_1^2) + x_0 x_1 \in GF(2^n).$$

The equality for an operation of inversion in the field $GF(2^{2n})$ is $$(x_0\alpha + x_1\alpha^2)^{-1} = (x_0\alpha^2 + x_1\alpha)/N = (x_1/N)\alpha + (x_0/N)\alpha^2$$

Figure 1:
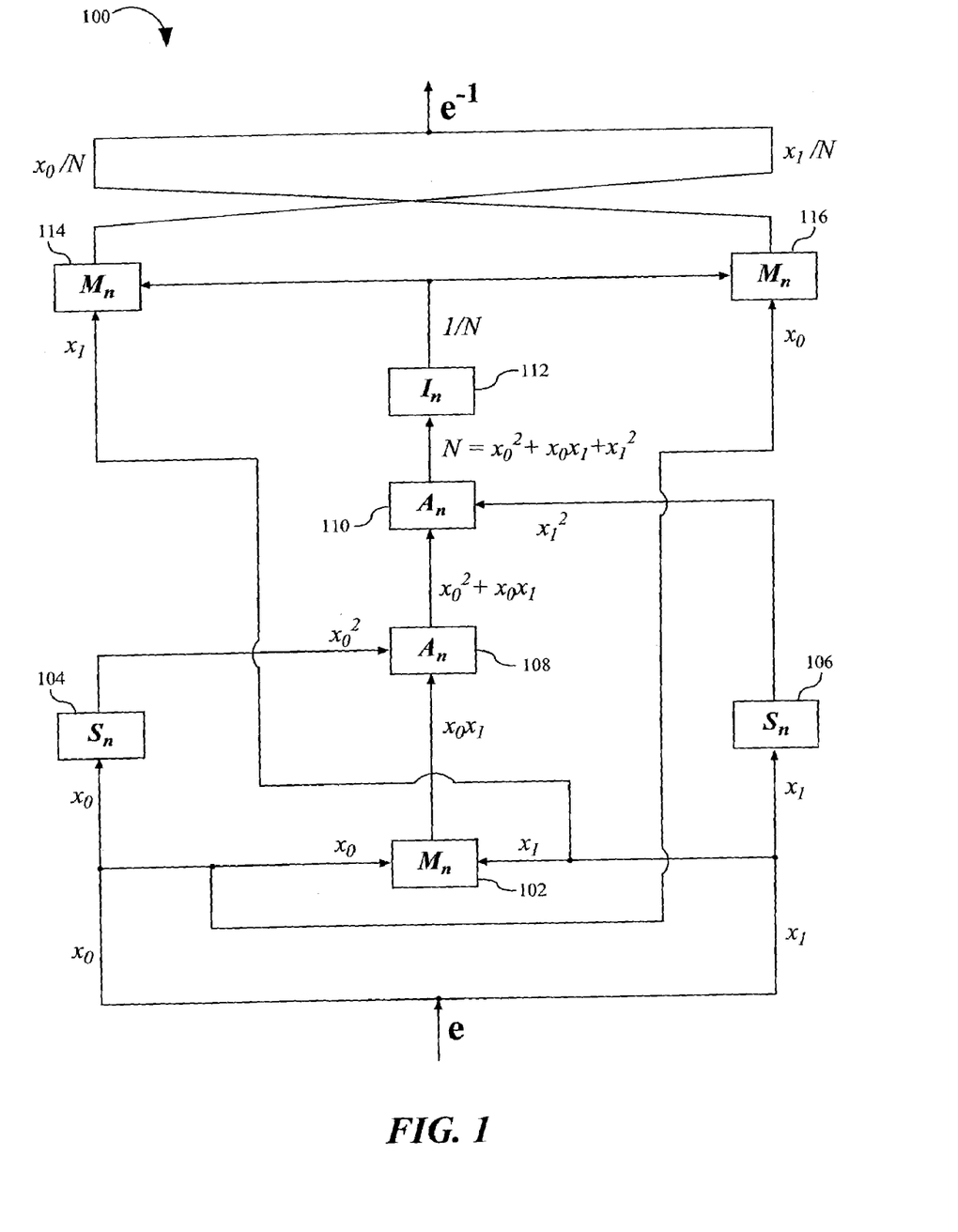
FIG. 1 shows an exemplary configuration of a 2n-bit inverse calculation device in accordance with the present invention.

FIG. 1 shows an exemplary configuration of a 2n-bit inverse calculation device 100 according to one aspect of the present invention. The 2n-bit inverse calculation device 100 may include two n-bit exclusive OR units ($A_n$) 108 and 110, three n-bit multiplication units ($M_n$) 102, 114 and 116, two n-bit square units ($S_n$) 104 and 106, and one n-bit inverse calculation unit ($I_n$) 112.

As shown in FIG. 1, the 2n-bit inverse calculation device 100 may calculate the inverse $e^{-1}=(x_1/N)\alpha+(x_0/N)\alpha^2 \in GF(2^{2n})$ of an element $e=x_0\alpha+x_1\alpha^2 \in GF(2^{2n})$ by using arithmetic operations in a subfield $GF(2^n)$. First, a 2n-bit input e may be split into two n-bit parts $x_0$ and $x_1$. Then, $x_0$ may be duplicated to provide inputs to $M_n$ 102, $S_n$ 104, and $M_n$ 116, and $x_1$ may be duplicated to provide inputs to $M_n$ 102, $S_n$ 106, and $M_n$ 114. $M_n$ 102 may receive inputs $x_0$ and $x_1$ and output $x_0 x_1$, which may be an input to $A_n$ 108. $S_n$ 104 may receive $x_0$ as an input and output $x_0^2$, which may become an input to $A_n$ 108. $A_n$ 108 may receive $x_0 x_1$ and $x_0^2$ as inputs and output $x_0 x_1 + x_0^2$, which may become an input to $A_n$ 110. $S_n$ 106 may receive $x_1$ as an input and output $x_1^2$, which may become an input to $A_n$ 110. $A_n$ 110 may receive $x_0 x_1 + x_0^2$ and $x_1^2$ as inputs and output $x_0 x_1 + x_0^2 + x_1^2$, which is the norm N and may become an input to $I_n$ 112. $I_n$ 112 may receive N as an input and output 1/N, which may be duplicated to provide inputs to $M_n$ 114 and $M_n$ 116. $M_n$ 116 may receive $x_0$ and 1/N as inputs and output $x_0/N$. $M_n$ 114 may receive $x_1$ and 1/N as inputs and output $x_1/N$. $x_0/N$ and $x_1/N$ may then be joined and outputted as the inverse $e^{-1}$, which is in 2n bits.

Recurrent upper bound of the complexity of an inversion is $$L(I(2n)) \leq L(I(n)) + 2L(M(n)) + L(N(2n)),$$

where $L(N(2n))$ is the complexity of the norm, and $L(M(n))$ is the complexity of multiplication in the field $GF(2^n)$.

Recurrent upper bound of the depth of inversion is $$D(I(2n)) \leq D(I(n)) + D(M(n)) + D(N(2n)).$$

Valid estimation of the complexity and the depth of norm N may be as follows:

$$L(N(2n)) \leq L(M(n)) + 2L(K(n)) + n,$$

$$D(N(2n)) \leq D(M(n)) + 1,$$

where $L(K(n))$ is the complexity of squaring in the base $B_\beta$ of the field $GF(2^n)$. If $B_\beta$ is a normal basis, then $L(K(n))=0$, and $$L(N(2n)) = L(M(n)),$$

$$D(N(2n)) = D(M(n))$$

in many practical cases.

Multiplication may be represented by the formula $$(x_0\alpha + x_1\alpha^2)(y_0\alpha + y_1\alpha^2) = (x_1y_0 + (x_1+x_0)y_1)\alpha + (x_1y_0 + x_0(y_0+y_1))\alpha^2$$

Recurrent upper bounds of the complexity and the depth of multiplication are $$L(M(2n)) \leq 3L(M(n)) + 4n,$$

$$D(M(2n)) \leq D(M(n)) + 2.$$

Using Cubic Extension

Let $k=3$, and n does not divide by 3. One may use in the field $GF(2^{3n})$ a basis $$B_{\alpha\beta} = \{\alpha\beta, \alpha\beta^2, \ldots, \alpha\beta^{2^{n-1}}, \ldots, \alpha^4\beta, \ldots, \alpha^4\beta^{2^{n-1}}\},$$

which is a product of the optimal normal basis of order 3

$$B_\alpha = \{\alpha, \alpha^2, \alpha^4\}, \alpha^2 + \alpha^3 = 1$$

and any normal (or standard polynomial) basis $B_\beta$.

In field $GF(2^n)$ the norm N of any element $$(x_0\alpha + x_1\alpha^2 + x_2\alpha^4) \in GF(q^3), q=2^n, x_i \in GF(q)$$

is $$N = (x_0\alpha + x_1\alpha^2 + x_2\alpha^4)(x_1\alpha + x_2\alpha^2 + x_0\alpha^4)(x_2\alpha + x_0\alpha^2 + x_1\alpha^4)$$

$$= x_0 x_1 x_2 + (x_1^2 + x_2^2)x_2 + (x_0^2 + x_2^2)x_0 + (x_1^2 + x_0^2)x_1$$

$$= x_0 x_1 x_2 + (x_1 + x_2)^3 + (x_0 + x_2)^2(x_0 + x_1) \in GF(q).$$

Inversion of any element $$(x_0\alpha + x_1\alpha^2 + x_2\alpha^4) \in GF(q^3), x_i \in GF(q)$$

may be represented by the equality $$(x_0\alpha + x_1\alpha^2 + x_2\alpha^4)^{-1} = (x_1\alpha + x_2\alpha^2 + x_0\alpha^4)(x_2\alpha + x_0\alpha^2 + x_1\alpha^4)/N$$

where $$(x_1\alpha + x_2\alpha^2 + x_0\alpha^4)(x_2\alpha + x_0\alpha^2 + x_1\alpha^4) = ((x_0+x_2)^2 + x_1 x_2)\alpha + ((x_1+x_0)^2 + x_0 x_2)\alpha^2 + ((x_1+x_2)^2 + x_1 x_0)\alpha^4$$

This equality demonstrates that coordinates $X_i$ of inverse element $(x_0\alpha + x_1\alpha^2 + x_2\alpha^4)^{-1}$ may be shifted if coordinates $x_i$ are shifted.

Figure 2:
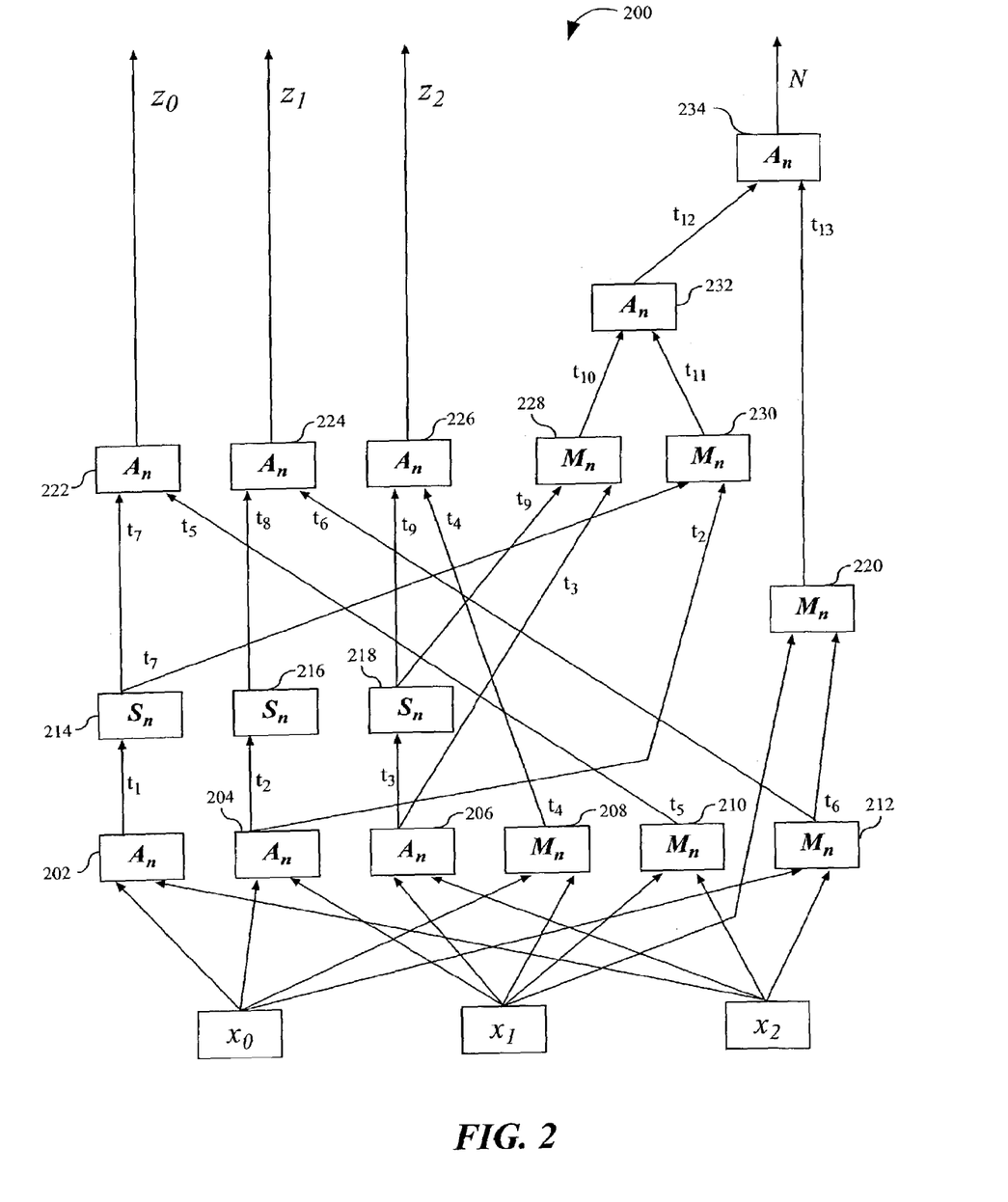
FIG. 2 depicts an exemplary configuration of a 3n-bit inverse calculation device in accordance with the present invention.

Referring now to FIG. 2, an exemplary configuration of a 3n-bit inverse calculation device 200 according to one aspect of the present invention is shown. The 3n-bit inverse calculation device 200 may include eight n-bit exclusive OR units ($A_n$) 202, 204, 206, 222, 224, 226, 232 and 234, six n-bit multiplication units ($M_n$) 208, 210, 212, 220, 228, and 230, and three n-bit square units ($S_n$) 214, 216 and 218.

The 3n-bit inverse calculation device 200 may calculate the inverse $E^{-1} = [((x_0+x_2)^2 + x_1 x_2)/N]\alpha + [((x_1+x_0)^2 + x_0 x_2)/N]\alpha^2 + [((x_1+x_2)^2 + x_1 x_0)/N]\alpha^4 = (z_0/N)\alpha + (z_1/N)\alpha^2 + (z_2/N)\alpha^4 \in GF(2^{3n})$ of an element $E = (x_0\alpha + x_1\alpha^2 + x_2\alpha^4) \in GF(2^{3n})$ by using arithmetic operations in a subfield $GF(2^n)$. First, a 3n-bit input E may be split into three n-bit parts $x_0$, $x_1$ and $x_2$. $A_n$ 202 may have $x_0$ and $x_2$ as inputs and output $t_1 = x_0 + x_2$. $S_n$ 214 may have $t_1$ as an input and output $t_7 = t_1^2 = (x_0+x_2)^2$, which may become inputs to $A_n$ 222 and $M_n$ 230. $A_n$ 204 may have $x_0$ and $x_1$ as inputs and output $t_2 = x_0 + x_1$, which may become inputs to $S_n$ 216 and $M_n$ 230. $S_n$ 216 may have $t_2$ as an input and output $t_8 = t_2^2 = (x_0+x_1)^2$, which may become an input to $A_n$ 224. $A_n$ 206 may have $x_1$ and $x_2$ as inputs and output $t_3 = x_1 + x_2$, which may become inputs to $S_n$ 218 and $M_n$ 228. $S_n$ 218 may have $t_3$ as an input and output $t_9 = t_3^2 = (x_1+x_2)^2$, which may become inputs to $A_n$ 226 and $M_n$ 228.

$M_n$ 208 may have $x_0$ and $x_1$ as inputs and output $t_4 = x_0 x_1$, which may become an input to $A_n$ 226. $M_n$ 210 may have $x_1$ and $x_2$ as inputs and output $t_5 = x_1 x_2$, which may become an input to $A_n$ 222. $M_n$ 212 may have $x_0$ and $x_2$ as inputs and output $t_6 = x_0 x_2$, which may become inputs to $A_n$ 224 and $M_n$ 220. $M_n$ 220 may have $x_1$ and $t_6$ as inputs and output $t_{13} = x_1 t_6 = x_0 x_1 x_2$, which may become an input to $A_n$ 234.

$A_n$ 222 may receive $t_5$ and $t_7$ as inputs and output $z_0 = (x_0+x_2)^2 + x_1 x_2$. $A_n$ 224 may receive $t_6$ and $t_8$ as inputs and output $z_1 = (x_1+x_0)^2 + x_0 x_2$. $A_n$ 226 may receive $t_4$ and $t_9$ as inputs and output $z_2 = (x_1+x_2)^2 + x_1 x_0$.

$M_n$ 228 may have $t_3$ and $t_9$ as inputs and output $t_{10} = t_3 t_9 = (x_1+x_2)(x_1+x_2)^2 = (x_1+x_2)^3$, which may become an input to $A_n$ 232. $M_n$ 230 may have $t_2$ and $t_7$ as inputs and output $t_{11} = t_2 t_7 = (x_0+x_1)(x_0+x_2)^2$, which may become an input to $A_n$ 232. $A_n$ 232 may have $t_{10}$ and $t_{11}$ as inputs and output $t_{12} = t_{10} + t_{11} = (x_1+x_2)^3 + (x_0+x_1)(x_0+x_2)^2$, which may become an input to $A_n$ 234. $A_n$ 234 may have $t_{12}$ and $t_{13}$ as inputs and output $N = t_{12} + t_{13} = (x_1+x_2)^3 + (x_0+x_1)(x_0+x_2)^2 + x_0 x_1 x_2$.

After $z_0$, $z_1$, $z_2$, and N are obtained, those of ordinary skill in the art will understand how to obtain the inverse $E^{-1} = (z_0/N)\alpha + (z_1/N)\alpha^2 + (z_2/N)\alpha^4 \in GF(2^{3n})$. For example, an n-bit inverse calculation unit ($I_n$) may be provided, which may have N as an input and output $1/N$. Three additional n-bit multiplication units ($M_n$) may also be applied: the first $M_n$ may have $z_0$ and $1/N$ as inputs and output $z_0/N$; the second $M_n$ may have $z_1$ and $1/N$ as inputs and output $z_1/N$; the third $M_n$ may have $z_2$ and $1/N$ as inputs and output $z_2/N$. The obtained $z_0/N$, $z_1/N$ and $z_2/N$ may then be joined and outputted as the inverse $E^{-1}$, which is in 3n bits.

From the equality $$N = x_0 x_1 x_2 + (x_1 + x_2)^3 + (x_0 + x_2)^2(x_0 + x_1)$$

-continued $$= x_0(x_1x_2) + ((x_1+x_2)^2(x_1+x_2) + (x_0+x_2)^2(x_0+x_1)),$$

and assuming $D(M(n)) \geq D(K(n))+2$, upper bounds may be obtained:

$$L(N(3n)) \leq 4L(M(n))+2L(K(n))+4n,$$

$$D(N(3n)) \leq 2D(M(n))+1.$$

By realizing together with N operators $$(x_0+x_2)^2+x_1x_2$$

$$(x_1+x_0)^2+x_0x_2$$

$$(x_1+x_2)^2+x_1x_0$$

and parallel executing three times multiplication on $N^{-1}$, estimations for the complexity and the depth of inversion in the field $GF(2^{3n})$ are:

$$L(I(3n)) \leq L(I(n))+9L(M(n))+3L(K(n))+8n,$$

$$D(I(3n)) \leq D(I(n))+3D(M(n))+1;$$

and $$L(I(3n)) \leq L(I(n))+6L(M(n))+L(N(3n))+3L(K(n))+6n,$$

$$D(I(3n)) \leq D(I(n))+D(M(n))+D(N(3n)).$$

If $B_\beta$ is a normal basis, then $L(K(n))=0$.

Inversion in Field $GF(2^3)$

In a partial case $x_1 \in GF(2)$, the equality $x_1^2 = x_1$ is valid, and consequently one may have the norm $$N = x_0x_1x_2 + (x_1+x_2)^3 + (x_0+x_2)^2(x_0+x_1)$$
$$= x_0x_1x_2 + (x_1+x_2) + (x_0+x_2)(x_0+x_1)$$
$$= x_0x_1x_2 + x_1 + x_2 + x_0 + x_0x_2 + x_1x_2 + x_0x_1$$
$$= x_0 \lor x_1 \lor x_2$$

where $\lor$ represents a logical disjunction. The norm of nonzero elements in this case is equal to 1, so the inversion $$(x_0\alpha + x_1\alpha^2 + x_2\alpha^4)^{-1}$$

may be represented by the equalities:

$$(x_0+x_2)^2+x_1x_2 = x_0+x_2+x_1x_2 = x_0+x_2\neg x_1,$$

$$(x_1+x_0)^2+x_0x_2 = x_1+x_0+x_0x_2 = x_1+x_0\neg x_2,$$

$$(x_1+x_2)^2+x_1x_0 = x_1+x_2+x_1x_0 = x_2+x_1\neg x_0.$$

Consequently the complexity and the depth in this case have bounds:

$$L(I(3)) \leq 6,$$

$$D(I(3)) \leq 2.$$

Multiplication in Cubic Extension

Multiplication in a given basis $B_\alpha$ may be represented as follows:

$$(x_0\alpha + x_1\alpha^2 + x_2\alpha^4)(y_0\alpha + y_1\alpha^2 + y_2\alpha^4) =$$
$$((x_0y_1+x_1y_0)+(x_1y_2+x_2y_1)+x_2y_2)\alpha +$$
$$((x_0y_2+x_2y_0)+(x_1y_2+x_2y_1)+x_0y_0)\alpha^2 +$$
$$((x_0y_1+x_1y_0)+(x_0y_2+x_2y_0)+x_1y_1)\alpha^4$$

If the following brief notations are used, $$[i,j]=(x_i+x_j)(y_i+y_j),\ (i,j)=(x_iy_j+x_jy_i),\ (i)=x_iy_i,$$

then $$[i,j]=(i,j)+(i)+(j)$$

The multiplication equality may thus be rewritten as $$((x_0y_1+x_1y_0)+(x_1y_2+x_2y_1)+x_2y_2)=(0,1)+(1,2)+(2)=[0,1]+[1,2]+(0),$$

$$((x_0y_2+x_2y_0)+(x_1y_2+x_2y_1)+x_0y_0)=(0,2)+(1,2)+(0)=[0,2]+[1,2]+(1),$$

$$((x_0y_1+x_1y_0)+(x_0y_2+x_2y_0)+x_1y_1)=(0,1)+(0,2)+(1)=[0,1]+[0,2]+(2).$$

The valid upper bounds for the complexity and the depth of multiplication are:

$$L(M(3n)) \leq 6L(M(n))+12n,$$

$$D(M(3n)) \leq D(M(n))+3.$$

Using Biquadratic Extension

Let $k=4$, and n does not divide by 4. One may use in the field $GF(2^{4n})$ a basis $$B_{\alpha\beta}=\{\alpha\beta,\alpha\beta^2,\ldots,\alpha\beta^{2^{n-1}},\ldots,\alpha^8\beta,\ldots,\alpha^8\beta^{2^{n-1}}\},$$

which is a product of the optimal normal basis of order 4

$$B_\alpha\{\alpha,\alpha^2,\alpha^4,\alpha^8\},\ \alpha+\alpha^2+\alpha^3+\alpha^4=1,$$

and any normal (or standard polynomial) basis $B_\beta$.

Any element $$(x_0\alpha+x_1\alpha^2+x_2\alpha^4+x_3\alpha^8)\in GF(q^4), x_i\in GF(q), q=2^n,$$

may be inverted by the following equality:

$$(x_0\alpha+x_1\alpha^2+x_2\alpha^4+x_3\alpha^8)^{-1}=[(x_1\alpha+x_2\alpha^2+x_3\alpha^4+x_0\alpha^8)(x_2\alpha+x_3\alpha^2+x_0\alpha^4+x_1\alpha^8)(x_3\alpha+x_0\alpha^2+x_1\alpha^4+x_2\alpha^8)]/N$$

where the norm $$N=(x_1\alpha+x_2\alpha^2+x_3\alpha^4+x_0\alpha^8)(x_2\alpha+x_3\alpha^2+x_0\alpha^4+x_1\alpha^8)(x_3\alpha+x_0\alpha^2+x_1\alpha^4+x_2\alpha^8)(x_0\alpha+x_1\alpha^2+x_2\alpha^4+x_3\alpha^8)$$

is equal to $$\sum_{i=0}^{3}x_i^3\sum_{i=0}^{3}x_i + \sum_{i=0}^{3}x_i^2 x_{i\oplus 2}x_{i\oplus 3} + \left(\sum_{i\neq j}x_ix_j\right)^2 + \prod_{i=0}^{3}x_i \in GF(q),$$

and the product $$(x_1\alpha+x_2\alpha^2+x_3\alpha^4+x_0\alpha^8)(x_2\alpha+x_3\alpha^2+x_0\alpha^4+x_1\alpha^8)(x_3\alpha+x_0\alpha^2+x_1\alpha^4+x_2\alpha^8)$$

is equal to $$X_0\alpha+X_1\alpha^2+X_2\alpha^4+X_3\alpha^8,$$

where $$X_0=x_2(x_2{}^2+m(x_0,x_1,x_3))+x_1x_2(x_1+x_2)+x_0x_3(x_0+x_3)+x_1(x_0+x_3)^2+x_0x_2{}^2$$

$$X_1=x_3(x_3{}^2+m(x_2,x_2,x_0))+x_2x_3(x_2+x_3)+x_1x_0(x_1+x_0)+x_2(x_1+x_0)^2+x_1x_3{}^2,$$

$$X_2=x_0(x_0{}^2+m(x_2,x_3,x_1))+x_3x_0(x_3+x_0)+x_2x_1(x_2+x_1)+x_3(x_2+x_1)^2+x_2x_0{}^2,$$

$$X_3=x_1(x_1{}^2+m(x_3,x_0,x_2))+x_0x_1(x_0+x_1)+x_3x_2(x_3+x_2)+x_0(x_3+x_2)^2+x_3x_1{}^2,$$

where m (x, y, z) is a brief notation for xy+xz+yz, and ⊕ is addition modulo 4.

Coordinates $X_i$ of a given product shift if inputs shift.

For computation of N and all $X_i$, one may at first compute all products $x_ix_j$ with the complexity of 6L(M(n)), then compute all squares $x_i{}^2$ with the complexity of 4L(K(n)), then compute all sums $x_i+x_j$ with the complexity of 6n, then compute the formula $$\left(\sum_{i\neq j} x_ix_j\right)^2 + \prod_{i=0}^{3} x_i$$

with the complexity L(M(n))+L(K(n))+6n and the depth of less than or equal to 2D(M(n))+2(under the condition of D(M(n))≧D(K(n))+2), then compute $$\sum_{i=0}^{3} x_i^2 x_{i\oplus 2} x_{i\oplus 3} = x_0x_3(x_0x_2+x_1^2) + x_1x_2(x_0x_2+x_3^2)$$

with the complexity of 2L(M(n))+3n and the depth of 2D(M(n))+2, then compute $$\sum_{i=0}^{3} x_i^3 \sum_{i=0}^{3} x_i = \sum_{i=0}^{3} x_i^2 x_i \sum_{i=0}^{3} x_i$$

with the complexity of 5L(M(n))+n and the depth of 2D(M(n))+D(K(n))+2, and finally compute all $X_i$ with the complexity of 12L(M(n))+20n and the depth of 2D(M(n))+3.

The total complexity of the logic circuit with outputs N and $X_i$ may be equal to 26L(M(n))+36n+4L(K(n)), and the depth may be equal to 2D(M(n))+3+max{D(K(n)),1}.

Using the equality $$\sum_{i\neq j} x_ix_j = m(x_0, x_1, x_3) + m(x_3, x_0, x_2) + x_0x_3 + x_1x_2$$

may decrease the upper bound for complexity to 26L(M(n))+34n+4L(K(n)) under the condition of D(M(n))≧D(K(n))+3.

Using the equality $$X_0 = x_2^2(x_0+x_2) + x_1x_2(x_1+x_2) + (x_2+x_0+x_3)m(x_0, x_1, x_3)$$
$$= x_2^2(x_0+x_2+x_1) + x_1^2x_2 + (x_2+x_0+x_3)m(x_0, x_1, x_3)$$

one may rewrite other equalities as follows $$X_1=x_3^2(x_1+x_3+x_2)+x_2^2x_3+(x_3+x_1+x_0)m(x_1,x_2,x_0),$$

$$X_2=x_0^2(x_2+x_0+x_3)+x_3^2x_0+(x_0+x_2+x_1)m(x_2,x_3,x_1),$$

$$X_3=x_1^2(x_3+x_1+x_0)+x_0^2x_1+(x_1+x_3+x_2)m(x_3,x_0,x_2).$$

Therefore, for computation of all $X_i$ it is enough to use only sums $x_0+x_3$, $x_1+x_2$, and because all sums $$x_0+x_2+x_1,$$

$$x_1+x_3+x_2,$$

$$x_2+x_0+x_3,$$

$$x_3+x_1+x_0$$

may be computed with 4 additions, thus the total complexity may decrease to 26L(M(n))+30n+4L(K(n)) with the same depth of 2D(M(n))+3+max{D(K(n)),1} (under the condition of D(M(n))≧D(K(n))+3).

Final bounds for complexity and depth may be:

$$L(I(4n))\leq L(I(n))+30L(M(n))+4L(K(n))+30n,$$

$$D(I(4n))\leq D(I(n))+3D(M(n))+3+\max\{D(K(n)),1\}.$$

If $B_\beta$ is a normal basis, then $$L(K(n))=D(K(n))=0$$

Inversion in Field $GF(2^4)$

In a partial case $x_i \in GF(2)$, the equality $x_i^2 x_i$ is valid, and consequently the norm $$N = \sum_{i=0}^{3} x_i + \sum_{i=0}^{3} x_ix_{i\oplus 2}x_{i\oplus 3} + \sum_{i\neq j} x_ix_j + \prod_{i=0}^{3} x_i$$
$$= \sum_{I\subset\{0,1,2,3\}} \prod_{i\in I} x_i = x_0 \vee x_1 \vee x_2 \vee x_3$$

The norm of a nonzero element in this case is equal to 1, so inversion $$(x_0\alpha+x_1\alpha^2+x_2\alpha^4+x_3\alpha^8)^{-1}$$

may be represented by:

$$X_0=a_2(a_0+\neg m(a_0, a_1, a_3))+a_1(a_0+a_3),$$

$$X_1=a_3(a_1+\neg m(a_1, a_2, a_0))+a_2(a_1+a_0),$$

$$X_2=a_0(a_2+\neg m(a_2, a_3, a_1))+a_3(a_2+a_1),$$

$$X_3=a_1(a_3+\neg m(a_3, a_0, a_2))+a_0(a_3+a_2),$$

where $\neg m(x, y, z)$ denotes the negation of $m(x, y, z) = xy + xz + yz$.

Since $$a_2(a_0 + \neg m(a_0, a_1, a_3)) + a_1(a_0 + a_3) =$$
$$a_2(a_0 + a_0 a_1 + a_0 a_3 + a_1 a_3 + 1) + a_1(a_0 + a_3) =$$
$$(a_1 \neg a_2)(a_0 + a_3) + a_2(\neg a_0 \vee a_3),$$

the complexity of this equality is equal to 6 and the depth is equal to 3. Final bounds for the complexity and depth are $$L(I(4)) \leq 24,$$
$$D(I(4)) \leq 3.$$

Multiplication in Biquadratic Extension

In a given basis $$B_\alpha = \{\alpha, \alpha^2, \alpha^4, \alpha^8\}, \alpha + \alpha^2 + \alpha^3 + \alpha^4 = 1$$

the operation of multiplication may be represented by:

$$(a_0\alpha + a_1\alpha^2 + a_2\alpha^4 + a_3\alpha^8)(b_0\alpha + b_1\alpha^2 + b_2\alpha^4 + b_3\alpha^8) =$$
$$(a_1 b_2 + a_2 b_1 + a_0 b_2 + a_2 b_0 + a_1 b_3 + a_3 b_1 + a_3 b_3)\alpha +$$
$$(a_2 b_3 + a_3 b_2 + a_1 b_3 + a_3 b_1 + a_2 b_0 + a_0 b_2 + a_0 b_0)\alpha^2 +$$
$$(a_3 b_0 + a_0 b_3 + a_2 b_0 + a_0 b_2 + a_3 b_1 + a_1 b_3 + a_1 b_1)\alpha^4 +$$
$$(a_0 b_1 + a_1 b_0 + a_3 b_1 + a_1 b_3 + a_0 b_2 + a_2 b_0 + a_2 b_2)\alpha^8$$

Using the brief notation, one may have $$(a_1 b_2 + a_2 b_1 + a_0 b_2 + a_2 b_0 + a_1 b_3 + a_3 b_1 + a_3 b_3) = (1,2) + (0,2) + (1,3) + (3) = [1,2] + [0,2] + [1,3] + (0),$$

$$(a_2 b_3 + a_3 b_2 + a_1 b_3 + a_3 b_1 + a_2 b_0 + a_0 b_2 + a_1 b_1) = (2,3) + (1,3) + (2,0) + (1) = [2,3] + [1,3] + [2,0] + (0),$$

$$(a_3 b_0 + a_0 b_3 + a_2 b_0 + a_0 b_2 + a_3 b_1 + a_1 b_3 + a_2 b_2) = (3,0) + (2,0) + (3,1) + (2) = [3,0] + [2,0] + [3,1] + (1),$$

$$(a_0 b_1 + a_1 b_0 + a_3 b_1 + a_1 b_3 + a_0 b_2 + a_2 b_0 + a_3 b_3) = (0,1) + (3,1) + (0,2) + (3) = [0,1] + [3,1] + [0,2] + (2).$$

The complexity and the depth of multiplication (for odd n) thus have upper bounds $$L(M(4n)) \leq 10 L(M(n)) + 21n,$$
$$D(M(4n)) \leq D(M(n)) + 3.$$

EXAMPLE

Logical Circuits for Multiplicative Operations in the Field $GF(2^{12})$

From foregoing descriptions, it follows that one may construct a multiplication circuit in the field $GF(2^4)$ with the complexity $L(M(4)) = 31$ and the depth $D(M(4)) = 4$, and an inversion circuit with the complexity $L(M(4)) = 24$ and the depth $D(M(4)) = 3$.

Using the foregoing described method of cubic extension, one may thus construct logic circuits for multiplication and inversion in the field $GF(2^{12})$ with the following complexity and depth:

$$L(M(12)) = 6M(4) + 48 = 234,$$
$$D(M(12)) = 3 + D(M(4)) = 7,$$
$$L(I(12)) \leq L(I(4)) + 9L(M(4)) + 28 = 331, \text{ and}$$
$$D(I(12)) \leq D(I(4)) + 3D(M(4)) + 1 = 16.$$

Using 5th Degree Extension

Let k=5 and n does not divide by 5. One may use in the field $GF(2^{5n})$ a basis $$B_{\alpha\beta} = \{\alpha\beta, \alpha\beta^2, \ldots, \alpha\beta^{2^{n-1}}, \ldots, \alpha^{16}\beta, \ldots, \alpha^{16}\beta^{2^{n-1}}\},$$

which is a product of the optimal normal basis of order 5

$$B_\alpha = \{\alpha, \alpha^2, \alpha^4, \alpha^8, \alpha^{16}\}, \alpha + \alpha^2 + \alpha^4 + \alpha^5 = 1,$$

and any normal (or standard polynomial) basis $B_\beta$.

Any element $$x = (x_0\alpha + x_1\alpha^2 + x_2\alpha^4 + x_3\alpha^8 + x_4\alpha^{16}) \in GF(q^5), x_i \in GF(q), q = 2^n$$

may be inverted by the equality:

$$(x_0\alpha + x_1\alpha^2 + x_2\alpha^4 + x_3\alpha^8 + x_4\alpha^8)^{-1} = [\sigma(x)\sigma^2(x)\sigma^3(x)\sigma^4(x)]/N$$

where the norm N is equal to the product $$N = x\sigma(x)\sigma^2(x)\sigma^3(x)\sigma^4(x),$$

where $$\sigma(x) = (x_4\alpha + x_0\alpha^2 + x_1\alpha^4 + x_2\alpha^8 + x_3\alpha^{16})$$

is a shift of vector x, and $\sigma^k(x) = \sigma(\sigma^{k-1}(x))$ is k-multiple shift (shift on k positions).

Using the equality $\sigma(x)\sigma(y) = \sigma(xy)$, the norm may be an invariant concerning a shift because $$\sigma(N) = \sigma(x\sigma(x)\sigma^2(x)\sigma^3(x)\sigma^4(x))$$
$$= \sigma(x)\sigma^2(x)\sigma^3(x)\sigma^4(x)\sigma^5(x)$$
$$= \sigma(x)\sigma^2(x)\sigma^3(x)\sigma^4(x)x$$
$$= N$$

Therefore $$N = x_0\alpha + x_1\alpha^2 + x_2\alpha^4 + x_3\alpha^8 + x_4\alpha^{16} = x_0 = x_1 = x_2 = x_3 = x_4,$$

since $$\alpha + \alpha^2 + \alpha^4 + \alpha^8 + \alpha^{16} = 1.$$

N may be computed:

$$N = \left(\sum_{i=0}^{4} x_i^2 + \sum_{i<j} x_i x_j\right)^2 \sum_{i=0}^{4} x_i + \sum_{i=0}^{4} x_i^2 x_{i\oplus 2}(x_{i\oplus 1} x_{i\oplus 4} + x_{i\oplus 3}^2) +$$
$$\sum_{i=0}^{4} x_i^3 ((x_i + x_{i\oplus 1})(x_{i\oplus 2} + x_{i\oplus 3}) + x_{i\oplus 3}^2 + X_{i\oplus 1}^2 + x_{i\oplus 4} x_{i\oplus 3}) +$$

-continued $$\prod_{i=0}^{4} x_i \in GF(q),$$

where $\oplus$ is addition modulo 5.

One may also note that $$\sigma(x)\sigma^2(x)\sigma^3(x)\sigma^4(x) = X_0\alpha + X_1\alpha^2 + X_2\alpha^4 + X_3\alpha^8 + X_4\alpha^{16}$$

where all coordinates $X_i$ shift if inputs shift.

In fact, $$\sigma(\sigma(x)\sigma^2(x)\sigma^3(x)\sigma^4(x)) = \sigma(Nx^{-1}) = N\sigma(x)^{-1} = \sigma(\sigma(x)\sigma^2 \\ (\sigma(x))\sigma^3(\sigma(x))\sigma^4(\sigma(x))).$$

Therefore for brevity one may compute only the first coordinate in this product $$X_0 = (x_2^2 + x_4^2)(x_0^2 + x_1^2 + x_3^2 + x_4^2) + x_0^4 + x_1^4 + x_1x_2x_3x_4 + x_4^3(x_1 + x_2) +$$
$$x_2^3(x_1 + x_3) + x_4(x_1^3 + x_3^3) + x_1^2x_2x_3 + x_3^2x_2x_4 + x_4^2x_1x_3 +$$
$$x_0^2(x_1x_2 + x_3x_4 + x_1x_3)$$

To estimate the complexity of inversion, one may assume for simplicity that in the field $GF(2^n)$ a normal basis is chosen.

At first one may compute all cubes $x_i^3$ with the complexity of $5L(M(n))$ and the depth of $D(M(n))$, then compute all products $x_ix_j$ with the same depth and the complexity of $10L(M(n))$, then compute all sums $\alpha_i + \alpha_j, \alpha_i^4 + \alpha_{i\oplus 1}^4, \alpha_i^2 + \alpha_{i\oplus 2}^2$, with the depth of 1 and the complexity of 20n, and all sums $\alpha_i^3 + \alpha_{i\oplus 2}^3$ with the depth of $1+D(M(n))$ and the complexity of 5n.

Then one may compute the formula $$\left(\sum_{i=0}^{4} x_i^2 + \sum_{i<j} x_ix_j\right)^2 \sum_{i=0}^{4} x_i$$

with the complexity of $4L(M(n))+6n$ and the depth of $3+2D(M(n))$, using the equality $$\sum_{i=0}^{4} x_i^2 + \sum_{i<j} x_ix_j = (x_3^2 + x_0^2 + x_0x_1) + (x_1^2 + x_4^2 + x_3x_4) +$$
$$(x_0 + x_1 + x_2)(x_2 + x_3 + x_4)$$

Next one may compute the formula $$\sum_{i=0}^{4} x_i^3((x_i + x_{i\oplus 1})(x_{i\oplus 2} + x_{i\oplus 3}) + x_{i\oplus 3}^2 + x_{i\oplus 1}^2 + x_{i\oplus 4}x_{i\oplus 3})$$

with the complexity of $10L(M(n))+14n$ and the depth of $5+2D(M(n))$, and the formula $$\sum_{i=0}^{4} x_i^2 x_{i\oplus 2}(x_{i\oplus 1}x_{i\oplus 4} + x_{i\oplus 3}^2)$$

with the complexity of $10L(M(n))+9n$ and the depth of $4+2D(M(n))$.

Then one may compute the sum of the last formula with the complexity of $10L(M(n))+14n+10L(M(n))+9n$ and the depth of $6+2D(M(n))$.

But the depth may be decreased on 1 without increasing the complexity if one represents this sum as the sum of 10 additive terms, from which only 5 terms have the depth of $2+2D(M(n))$ and others have the depth of $1+2D(M(n))$, and construct a binary tree from operations of addition so that 5 of its vertex have the depth of 3, and the other 5 vertex have the depth of 4.

Therefore the sum of the foregoing three given formulas has the complexity of $24L(M(n))+29n$ and the depth of $6+2D(M(n))$. One may add a term $$\prod_{i=0}^{4} x_i$$

with the complexity of $2L(M(n))+n$ and the depth of $2D(M(n))+1+\max\{D(M(n)),6\}$. Therefore the norm $N$ computed may have the complexity of $$41L(M(n))+57n$$

and the depth of $$2D(n)+1+\max\{D(M(n)),6\}.$$

The formula $$(X_{i\oplus 2}^2 + X_{i\oplus 4}^2)(X_i^2 + X_{i\oplus 1}^2 + X_{i\oplus 3}^2 + X_{i\oplus 4}^2) + X_i^4 + X_{i\oplus 1}^4$$

computed may have the complexity of $5L(M(n))+10n$ and the depth of $3+D(M(n))$.

The formula $$x_{i\oplus 4}^3(x_{i\oplus 1} + x_{i\oplus 2}) + x_{i\oplus 2}^3(x_{i\oplus 1} + x_{i\oplus 3}) + x_{i\oplus 4}(x_{i\oplus 1}^3 + x_{i\oplus 3}^3) +$$
$$x_{i\oplus 1}^2 x_{i\oplus 2} x_{i\oplus 3} + x_{i\oplus 1} x_{i\oplus 2} x_{i\oplus 3} x_{i\oplus 4} + x_{i\oplus 3}^2 x_{i\oplus 2} x_{i\oplus 4} +$$
$$x_{i\oplus 4}^2 x_{i\oplus 1} x_{i\oplus 3} + x_i^2(x_{i\oplus 1} x_{i\oplus 2} + x_{i\oplus 3} x_{i\oplus 4} + x_{i\oplus 1} x_{i\oplus 3})$$

computed may have the complexity of $40L(M(n))+45n$ and the depth of $4+2D(M(n))$.

Therefore the system $X_i$, $i=0, \ldots, 4$ may have the complexity $$45L(M(n))+60n$$

and the depth $$5+2D(M(n)).$$

The complexity of operator $N, X_i$ is equal to $$45(L(M(n))+60n+41L(M(n))+57n=86L(M(n))+117n,$$

and the depth is equal to $2D(M(n))+1+\max\{D(M(n)), 6\}$.

Final estimates for the complexity and depth of inversion are $$L(I(5n)) \leq L(I(n))+91L(M(n))+117n,$$

$$D(I(5n)) \leq D(I(n))+3D(M(n))+1+\max\{D(M(n)),6\}.$$

Inversion in Field GF($2^5$)

In a partial case $x_i \in GF(2)$, the equality $x_i^2 = x_1$ is valid, and consequently the norm of a nonzero element is equal to 1.

As all coordinates of an element $$(x_0\alpha + x_1\alpha^2 + x_2\alpha^4 + x_3\alpha^8 + x_4\alpha^{16})^{-1}$$

shift, if inputs shift, then it may be sufficient to compute only the first coordinate as follows:

$$\begin{aligned}X_0 &= (x_2^2+x_4^2)(x_0^2+x_1^2+x_3^2+x_4^2)+x_0^4+x_1^4+x_1x_2x_3x_4+\\&\quad x_4^3(x_1+x_2)+x_2^3(x_1+x_3)+x_4(x_1^3+x_3^3)+x_1^2x_2x_3+\\&\quad x_3^2x_2x_4+x_4^2x_1x_3+x_0^2(x_1x_2+x_3x_4+x_1x_3)\\&= x_4x_1+x_4+x_0+x_1+x_1x_2x_3x_4+x_2x_0+x_4x_0+\\&\quad x_1x_2x_3+x_3x_2x_4+x_4x_1x_3+x_0(x_1x_2+x_3x_4+x_1x_3)\\&= \overline{x_2x_2}(x_1 \vee x_4)+x_0x_1(x_2+x_3)+x_3x_4(x_0+x_1)+x_0\overline{x_2+x_4},\end{aligned}$$

where $\overline{x}$ is a brief notation for negation $\neg x$.

The depth of this formula is 4, and the complexity is 14. Final estimations for the complexity and depth of inversion are $$D(I(5)) \leq 4,$$

$$L(I(5)) \leq 55.$$

Multiplication in 5th Degree Extension

Using brief notations, multiplications may be represented by the formula $$(a_0\alpha+a_1\alpha^2+a_2\alpha^4+a_3\alpha^8+a_4\alpha^{16})(b_0\alpha+b_1\alpha^2+b_2\alpha^4+b_3\alpha^8+b_4\alpha^{16})=(c_0\alpha+c_1\alpha^2+c_2\alpha^4+c_3\alpha^8+c_4\alpha^{16}),$$

$$c_0=(0,1)+(1,3)+(2,3)+(2,4)+(4),$$

$$c_1=(1,2)+(2,4)+(3,4)+(3,0)+(0),$$

$$c_2=(2,3)+(3,0)+(4,0)+(4,1)+(1),$$

$$c_3=(3,4)+(4,1)+(0,1)+(0,2)+(2),$$

$$c_4=(4,0)+(0,2)+(1,2)+(1,3)+(3),$$

where $$(i,j)=(x_iy_j+x_jy_i), (i)=x_iy_i$$

The complexity and the depth of multiplication (n does not divide by 5) may have upper bounds:

$$L(M(5n)) \leq 15L(M(n))+40n,$$

$$D(M(5n)) \leq D(M(n))+4.$$

EXAMPLE

Logical Circuits for Multiplicative Operations in the Field GF($2^{20}$)

Using extension of 5th degree, one may construct a logic circuit for inversion with the complexity of $$L(I(20)) \leq L(I(4))+91L(M(4))+468=3100+468+24=3313$$

and the depth of $$D(I(20)) \leq D(I(4))+3D(M(4))+1+\max\{D(M(4)),6\}=22$$

since $L(M(4))=31, D(M(4))=4, L(I(4))=24, D(I(4))=3$, as shown in the foregoing description.

Using biquadratic extension one may construct a logic circuit for inversion with the complexity of $$L(I(20)) \leq L(I(5))+30L(M(5))+170=1875$$

and the depth of $$D(I(20)) \leq D(I(5))+3D(M(5))+4=23.$$

Both logic circuits use different bases in the field GF($2^{20}$), but these bases are equivalent: one is permutation of another, and some are a normal base in this field. For any from these bases, the complexity and the depth of multiplication may have upper bounds $$L(M(20)) \leq 15L(M(4))+160=625,$$

$$D(M(20)) \leq D(M(4))+4=8.$$

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is also understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A device for calculating an inversion in finite field $GF(2^{2n})$, wherein n is a positive integer, comprising:
   (a) means for expressing an element $e \in GF(2^{2n})$ as $$e = x_0\alpha + x_1\alpha^2 (x_0, x_1 \in GF(2^n))$$

where $\alpha + \alpha^2 = 1$ so that an inverse $e^{-1}$ of said element e in said finite field $GF(2^{2n})$ is expressed as a combination of arithmetic operations performed in subfield $GF(2^n)$ given by $$e^{-1} = (x_1/N)\alpha + (x_0/N)\alpha^2$$

where $N = (x_0^2 + x_1^2) + x_0 x_1 \in GF(2^n)$ by using an optimal normal basis of order 2 $\{\alpha, \alpha^2\}$; and
   (b) means for calculating said inverse $e^{-1}$ of said element e in said finite field $GF(2^{2n})$ by executing said combination of arithmetic operations in said subfield $GF(2^n)$.

2. A device for calculating an inversion in finite field $GF(2^{3n})$, wherein n is a positive integer, comprising:
   (a) means for expressing an element $e \in GF(2^{3n})$ as $$e = x_0\alpha + x_1\alpha^2 + x_2\alpha^4 (x_0, x_1, x_2 \in GF(2^n))$$

where $\alpha^2 + \alpha^3 = 1$ so that an inverse $e^{-1}$ of said element e in said finite field $GF(2^{3n})$ is expressed as a combination of arithmetic operations performed in subfield $GF(2^n)$ given by $$e^{-1} = [((x_0+x_2)^2 + x_1 x_2)/N]\alpha + [((x_1+x_0)^2 + x_0 x_2)/N]\alpha^2 + [((x_1+x_2)^2 + x_1 x_0)/N]\alpha^4$$

where $N = x_0 x_1 x_2 + (x_1+x_2)^3 + (x_0+x_2)^2(x_0+x_1) \in GF(2^n)$ by using an optimal normal basis of order 3 $\{\alpha, \alpha^2, \alpha^4\}$; and
   (b) means for calculating said inverse $e^{-1}$ of said element e in said finite field $GF(2^{3n})$ by executing said combination of arithmetic operations in said subfield $GF(2^n)$.

3. The device of claim 2, wherein said n=1.

4. A device for calculating an inversion in finite field $GF(2^{4n})$, wherein n is a positive integer, comprising:
   (a) means for expressing an element $e \in GF(2^{4n})$ as $$e = x_0\alpha + x_1\alpha^2 + x_2\alpha^4 + x_3\alpha^8 (x_0, x_1, x_2, x_3 \in GF(2^n))$$

where $\alpha + \alpha^2 + \alpha^3 \alpha^4 = 1$ so that an inverse $e^{-1}$ of said element e in said finite field $GF(2^{4n})$ is expressed as a combination of arithmetic operations performed in subfield $GF(2^n)$ given by $$e^{-1} = (X_0/N)\alpha + (X_1/N)\alpha^2 + (X_2/N)\alpha^4 + (X_3/N)\alpha^8$$

where $$N = \sum_{i=0}^{3} x_i^3 \sum_{i=0}^{3} x_i + \sum_{i=0}^{3} x_i^2 x_{i\oplus 2} x_{i\oplus 3} + \left(\sum_{i \neq j} x_i x_j\right)^2 + \prod_{i=0}^{3} x_i \in GF(2^n)$$

$$X_0 = x_2^2(x_0+x_2+x_1) + x_1^2 x_2 + (x_2+x_0+x_3)m(x_0,x_1,x_3)$$

$$X_1 = x_3^2(x_1+x_3+x_2) + x_2^2 x_3 + (x_3+x_1+x_0)m(x_1,x_2,x_0)$$

$$X_2 = x_0^2(x_2+x_0+x_3) + x_3^2 x_0 + (x_0+x_2+x_1)m(x_2,x_3,x_1)$$

$$X_3 = x_1^2(x_3+x_1+x_0) + x_0^2 x_1 + (x_1+x_3+x_2)m(x_3,x_0,x_2)$$

$\oplus$ is addition modulo 4, by using an optimal normal basis of order 4 $\{\alpha, \alpha^2, \alpha^4, \alpha^8\}$; and
   (b) means for calculating said inverse $e^{-1}$ of said element e in said finite field $GF(2^{4n})$ by executing said combination of arithmetic operations in said subfield $GF(2^n)$.

5. The device of claim 4, wherein said n=1.

6. A device for calculating an inversion in finite field $GF(2^{5n})$, wherein n is a positive integer, comprising:
   (a) means for expressing an element $e \in GF(2^{5n})$ as $$e = x_0\alpha + x_1\alpha^2 + x_2\alpha^4 + x_3\alpha^8 + x_4\alpha^{16} (x_0, x_1, x_2, x_3, x_4 \in GF(2^n))$$

where $\alpha + \alpha^2 + \alpha^4 + \alpha^5 = 1$ so that an inverse $e^{-1}$ of said element e in said finite field $GF(2^{5n})$ is expressed as a combination of arithmetic operations performed in subfield $GF(2^n)$ given by $$e^{-1} = [\sigma(x)\sigma^2(x)\sigma^3(x)\sigma^4(x)]/N$$

where $$\alpha(x) = (x_4\alpha + x_0\alpha^2 + x_1\alpha^4 + x_2\alpha^8 + x_3\alpha^{16})$$

$$N = \left(\sum_{i=0}^{4} x_i^2 + \sum_{i<j} x_i x_j\right)^2 \sum_{i=0}^{4} x_i + \sum_{i=0}^{4} x_i^2 x_{i\oplus 2}(x_{i\oplus 1} x_{i\oplus 4} + x_{i\oplus 3}^2) +$$

$$\sum_{i=0}^{4} x_i^3((x_i + x_{i\oplus 1})(x_{i\oplus 2} + x_{i\oplus 3}) + x_{i\oplus 3}^2 + x_{i\oplus 1}^2 + x_{i\oplus 4}x_{i\oplus 3}) +$$

$$\prod_{i=0}^{4} x_i \in GF(2^n)$$

$\oplus$ is addition modulo 5, by using an optimal normal basis of order 5 $\{\alpha, \alpha^2, \alpha^4, \alpha^8, \alpha^{16}\}$; and
   (b) means for calculating said inverse $e^{-1}$ of said element e in said finite field $GF(2^{5n})$ by executing said combination of arithmetic operations in said subfield $GF(2^n)$.

7. The device of claim 6, wherein n=1.

* * * * *